United States Patent
Wang et al.

(10) Patent No.: US 9,477,506 B2
(45) Date of Patent: Oct. 25, 2016

(54) DYNAMIC VIRTUAL MACHINES MIGRATION OVER INFORMATION CENTRIC NETWORKS

(71) Applicant: Futurewei Technologies, Inc., Plano, TX (US)

(72) Inventors: Guo-Qiang Wang, Santa Clara, CA (US); Guang Yu Liu, Burnaby (CA); Ravishankar Ravindran, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 126 days.

(21) Appl. No.: 14/100,238

(22) Filed: Dec. 9, 2013

(65) Prior Publication Data

US 2014/0229944 A1    Aug. 14, 2014

Related U.S. Application Data

(60) Provisional application No. 61/763,622, filed on Feb. 12, 2013.

(51) Int. Cl.
*G06F 9/455* (2006.01)
*G06F 9/50* (2006.01)

(52) U.S. Cl.
CPC ......... *G06F 9/45558* (2013.01); *G06F 9/5088* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2012/0008529 A1 | 1/2012 | Averbuch et al. | |
| 2012/0014386 A1 | 1/2012 | Xiong et al. | |
| 2012/0278804 A1 | 11/2012 | Narayanasamy et al. | |
| 2013/0232492 A1* | 9/2013 | Wang | H04L 61/103 718/1 |
| 2014/0149983 A1* | 5/2014 | Bonilla | G06F 9/45558 718/1 |

OTHER PUBLICATIONS

Plummer, D. C., "An Ethernet Address Resolution Protocol or Converting Network Protocol Addresses to 48.bit Ethernet Address for Transmission on Ethernet Hardware," RFC 826, Nov. 1982, 11 pages.
Narten, T., et al., "Neighbor Discovery for IP Version 6," (IPv6), RFC 4861, Sep. 2007, 98 pages.
(Continued)

*Primary Examiner* — Eric C Wai
(74) *Attorney, Agent, or Firm* — Futurewei Technologies, Inc.

(57) ABSTRACT

An apparatus comprising a memory and a processor coupled to the memory, wherein the memory contains instructions that when executed by the processor cause the apparatus to receive a migration request from a virtual machine (VM) proxy running on a first server hosting a VM, wherein the migration request comprises a VM identifier associated with the VM comprising a globally unique VM name and a current VM address associated with the first server, and wherein data packets associated with the VM are routed to the VM based upon the VM identifier and instruct a VM proxy running on a second server to receive the VM from the first server in response to the migration request, wherein the second server receives the VM, and wherein the VM name remains unchanged while the current VM address becomes associated with the second server after the second server receives the VM.

20 Claims, 9 Drawing Sheets

(56) References Cited

OTHER PUBLICATIONS

Foreign Communication From a Counterpart Application, PCT Application No. PCT/US2014/16047, International Search Report dated Jul. 11, 2014, 3 pages.

Foreign Communication From a Counterpart Application, PCT Application No. PCT/US2014/16047, Written Opinion dated Jul. 11, 2014, 5 pages.

* cited by examiner

DYNAMIC VIRTUAL MACHINES MIGRATION OVER INFORMATION CENTRIC NETWORKS

CROSS-REFERENCE TO RELATED APPLICATIONS

The present application claims priority to U.S. Provisional Patent Application No. 61/763,622 filed Feb. 12, 2013 by Guo-Qiang Wang, et al. and entitled "Method For Dynamic Virtual Machines Migration Over Information Centric Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual Machines (VMs) are software systems virtualized to share datacenter system and/or network resources such as computing power, routing, and data storage. A VM may run simultaneously with other VMs on a single server. VM operations may need to support migration among datacenter servers in order to effectively utilize datacenter and/or networking resources and to dynamically maintain a VM life circle. Migrations of VMs from one server to another server may require a dedicated network and centralized storage capabilities. Also, the migration may need to keep the Internet Protocol (IP)/Media Access Control (MAC) addresses of VMs unchanged after the move. This process may be referred to as a large scale layer 2 (L2) routing network. Some network technology developments may permit VM mobility across a backbone routing network. These requirements may not scale well with an increasing number of servers and/or routers in a modern datacenter (DC) and/or network. Additionally, migrating large scale VMs between geographically dispersed datacenters and access networks may further complicate the process. Therefore, there may be a need for a VM migration approach that may address scalability without further complicating the process.

SUMMARY

In one embodiment, the disclosure includes an apparatus comprising a memory and a processor coupled to the memory, wherein the memory contains instructions that when executed by the processor cause the apparatus to receive a migration request from a VM proxy running on a first server hosting a VM, wherein the migration request comprises a VM identifier associated with the VM comprising a globally unique VM name and a current VM address associated with the first server, and wherein data packets associated with the VM are routed to the VM based upon the VM identifier and instruct a VM proxy running on a second server to receive the VM from the first server in response to the migration request, wherein the second server receives the VM, and wherein the VM name remains unchanged while the current VM address becomes associated with the second server after the second server receives the VM.

In another embodiment, the disclosure includes a server comprising at least one hypervisor managing a plurality of VMs hosted by the server and a VM proxy in communication with the hypervisor and configured to receive a mobility message from the hypervisor comprising a first VM service profile, wherein the first VM service profile comprises a VM identifier associated with a first VM, a VM client identifier associated with at least one client that the first VM is serving, and a VM profile comprising shareable resources and non-shareable resources, wherein a first VM bootable image may be assembled from the shareable resources and the non-shareable resources, wherein the VM identifier comprises a globally unique first VM name and a current first VM address associated with the server, wherein data packets associated with the first VM are routed to the first VM based upon the VM identifier, and send a migration request to a VM mobility manager (VMMM) of a first network domain in response to the mobility message, wherein the migration request comprises the first VM service profile, wherein the migration request causes the first network domain VMMM to send a migration match message to any VM proxies within the first network domain and a VMMM of a second network domain, and wherein the migration match message comprises the first VM service profile.

In another embodiment, the disclosure includes a method comprising receiving a migration request from a VM proxy running on a first server hosting a VM, wherein the migration request comprises a VM identifier associated with the VM comprising a globally unique VM name and a current VM address associated with the first server, and wherein data packets associated with the VM are routed to the VM based upon the VM identifier, and instructing a VM proxy running on a second server to receive the VM from the first server in response to the migration request, wherein the second server receives the VM, and wherein the VM name remains unchanged while the current VM address becomes associated with the second server after the second server receives the VM.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Virtualization may be used in a DC network to enable a plurality of VMs to run on a single physical computer (e.g. a server.) A server may operate a hypervisor, which may act as a platform for VMs to provide access to shared processor, memory, storage, and/or network routing resources of the server. Dynamic movement of VMs (e.g. live migration) from one server to another may allow for dynamic load balancing or work distribution, which may be advantageous in a DC network. As many DC networks are implemented in layer 2, VM mobility may be implemented using layer 2 (e.g. Ethernet) and/or layer 2.5 (e.g. Multiprotocol Label Switching (MPLS)) techniques. A DC network may be considered layer 2 based if packets are switched inside a server rack and/or bridged among server racks (e.g. completely in layer 2.) From an IP point of view (e.g. network layer/Open Systems Interconnection (OSI) layer 3) layer 2 networked server nodes may be connected to a single link. Layer 2 based networks make allow for VM mobility, but may not scale well for address resolution protocols, such as Address Resolution Protocol (ARP). The disclosed VM system, apparatus, and/or a method is described in the context of a DC network. However, VM mobility as disclosed may also be implemented in the context of a service-oriented access network.

Disclosed herein is a system, apparatus, and/or a method to migrate a VM from a source server to a destination server in a DC network. The DC network may comprise a plurality of network domains and the source server may be located in a different network domain from the destination server. A globally unique VM identifier (e.g. an IP and/or MAC address) may remain unchanged following the migration. A server hosting the VM may serve as a point of attachment (PoA) for the VM, and consequently may serve as a network proxy for any data traffic associated with the VM. A DC network domain gateway may serve as a local mobility anchor for any VMs hosted by servers within the DC network domain. A VM mobility manager (VMMM) may be coupled to the DC network gateway and may manage the booking and handovers of VMs associated with servers within the DC network domain. The VMMM may perform the following within its DC network domain: enable data-flow anchoring control; facilitate DC network load balancing; maintain VM service profiles for any VMs associated with the DC network domain; facilitate inter and/or intra-DC network domain entity name resolutions and communications; and provide context aware VM resource management. The inter and/or intra-DC network domain communications may be in the form of multicasting, group casting, uni-casting, or bi-castings. Also, VMMMs may integrate with service distribution network (SDN) functions. A VMMM in a first DC network domain may coordinate with a VMMM in a second DC network domain for any inter-DC network domain functions. Routers and/or switches within the DC network may be information centric network (ICN) that enable and are capable of locally storing data packets in addition to routing the data packets.

Figure 1:
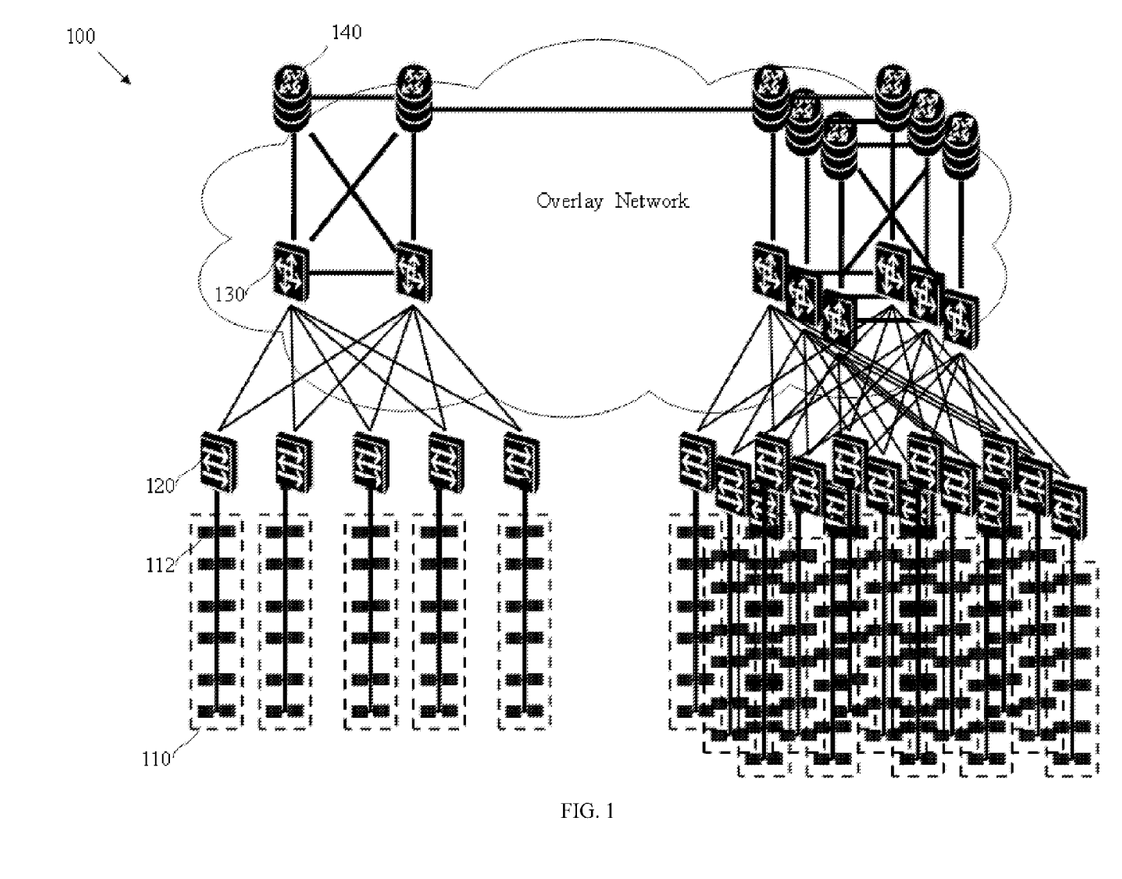
FIG. 1 is a schematic diagram of an embodiment of a DC network.

FIG. 1 illustrates an embodiment of a DC network 100, in which mobility of VMs and other entities may occur. DC network 100 may use a rack-based architecture, in which multiple equipment or machines (e.g., servers) may be arranged into rack units. For illustrative purposes, one of the racks is shown as rack 110, and one of the machines is shown as a server 112 mounted on the rack 110. There may be top of rack (ToR) switches located on racks, e.g., with a ToR switch 120 located on the rack 110. There may also be end of row switches or aggregation switches, such as an aggregation switch 130, each interconnected to multiple ToR switches 120 and routers. A plurality of routers may be used to interconnect other routers and switches. For example, a router 140 may be coupled to other routers and switches including the aggregation switch 130.

Core switches and/or routers may be configured to interconnect the DC network 100 with the gateway of another DC network or with the Internet. The aggregation switches 130 and ToR switches 120 may form an intra-DC network. The router 140 may provide a gateway to another DC network or the Internet. The DC network 100 may implement an overlay network and may comprise a large number of racks, servers, switches, and routers. Since each server may host a large number of applications running on VMs, DC network 100 may become fairly complex. Servers in the DC network 100 may host multiple VMs. To facilitate communications among multiple VMs hosted by one physical server (e.g., the server 112), one or more hypervisors may be set up on the server 112.

Figure 2:
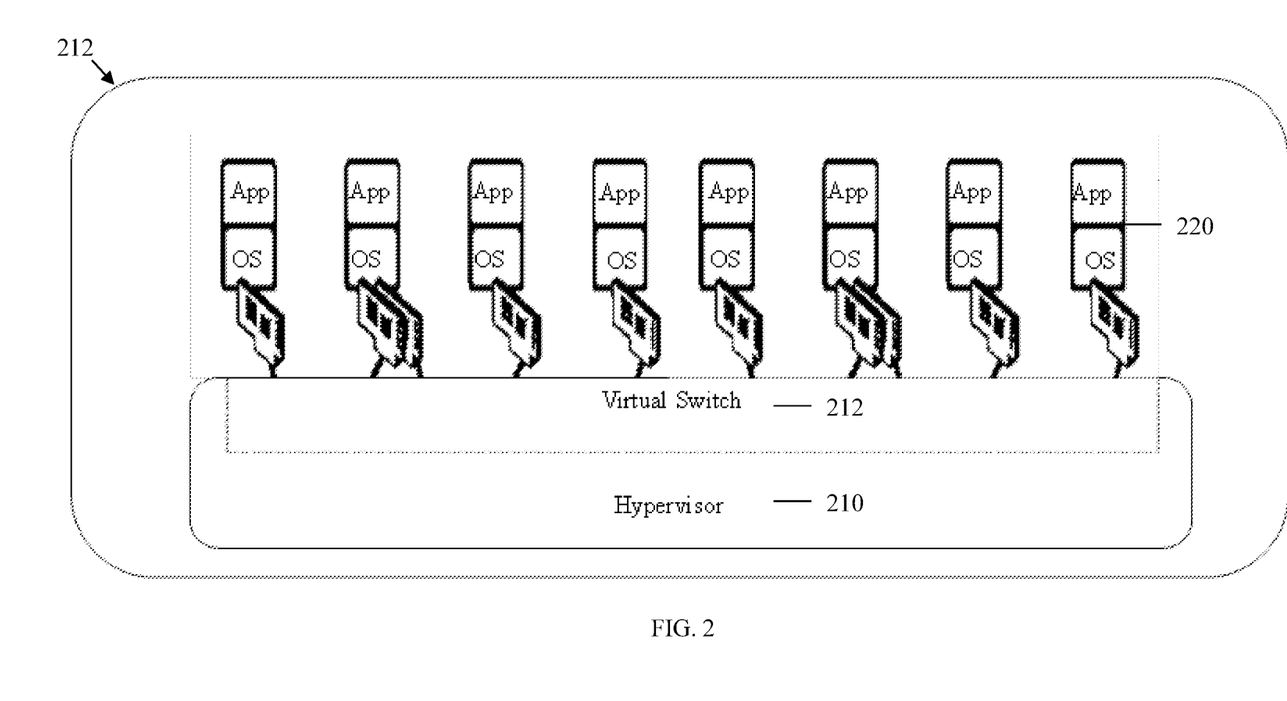
FIG. 2 is a schematic diagram of an embodiment of a server in DC network of FIG. 1.

FIG. 2 illustrates an embodiment of a server 112 in DC network 100 comprising a hypervisor 210 and a plurality of VMs 220 (one numbered as 220 in FIG. 2) coupled to the hypervisor 210. The hypervisor 210 may be configured to manage the VMs 220, each of which may implement at least one application (denoted as App) running on an operating system (OS). In an embodiment, the hypervisor 210 may comprise a virtual switch (denoted hereafter as vSwitch) 212. The vSwitch 212 may be coupled to the VMs 220 via ports and may provide basic switching functions to allow communications among any two of the VMs 220 without exiting the server 112.

Further, to facilitate communications between a VM 220 and an entity outside the server 112, the hypervisor 210 may provide encapsulation function or protocol, such as virtual extensible local area network (VXLAN) and network virtualization over generic routing encapsulation (NVGRE). When forwarding a data frame from a VM 220 to another network node, the hypervisor 210 may encapsulate the data frame by adding an outer header to the data frame. The outer header may comprise an address (e.g., an IP address) of the server 112, and addresses of the VM 220 may be contained only in an inner header of the data frame. Thus, the addresses of the VM 220 may be hidden from the other network node (e.g., router, switch). Similarly, when forwarding a data from another network to a VM 220, the hypervisor 210 may decapsulate the data frame by removing the outer header and keeping only the inner header.

"Underlay" network is a term sometimes used to describe the actual network that carries the encapsulated data frames. An "Underlay" network is very much like the "core" or "backbone" network in the carrier networks. The "Overlay" network and the "Underlay" network are loosely used interchangeably in this disclosure. Sometimes, an "Overlay" network is used in this disclosure to refer to a network with many boundary (or edge) nodes which perform encapsulation for data frames so that nodes/links in the middle do not see the addresses of nodes outside the boundary (edge) nodes. The terms "overlay boundary nodes" or "edge nodes" may refer to the nodes which add outer headers to data frames to/from hosts outside the core network. Overlay boundary nodes can be virtual switches on hypervisors, ToR switches, or even aggregation switches.

Figure 3:
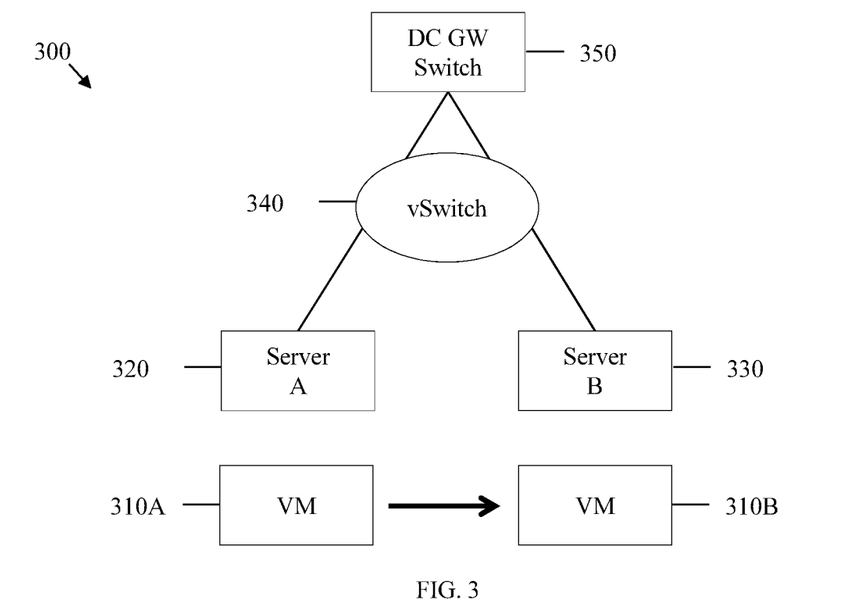
FIG. 3 is a schematic diagram of an embodiment of a DC network supporting VM mobility through address-based mobility control.

FIG. 3 illustrates an embodiment of a network 300 supporting VM mobility through address-based mobility control. Network 300 may comprise a source server (Server A) 320, a destination server (Server B) 330, a virtualized switch (vSwitch) 340, and DC gateway (GW) 350, which may be similar to servers 112, an intra-DC network switch, and router 140 of FIG. 1 respectively. Server A 320 and Server B 330 may each comprise at least one hypervisor (e.g. hypervisor 210 of FIG. 2) managing numerous VMs that may each be communicating with remote clients via vSwitch 340 and DC gateway 350. An identifier (e.g. an IP/MAC address) in network 300 may simultaneously serve dual roles of identifying an entity (e.g. content, a portion of content, a networking element (NE), or a VM) and the topological location of the entity. Network 300 may need to support VM migration from one server to another to balance DC network loads, effectively utilizing DC network resources, and dynamically maintain the VM life cycle. An identifier of a VM may need to be unchanged following the migration to keep a VM migration transparent to its corresponding client(s). A VM 310 at a time A prior to migration (VM 310A) may need to have the same identifier as the VM 310 at a time B following migration (VM 310B) for client service continuity throughout migration. For example, a client of VM 310 may lose access privileges to a network resource, rights to a software license tied to a particular identifier, or an application session by changing the identifier. Maintaining an unchanged identifier in network 300 may require VM 310A to be on the same subnet as VM 310B (i.e. keeping a flat L2 topology). Network 300 may need a fast and direct connection between VM 310A and VM 310B to keep a flat L2 topology and support such a migration. As a result, network 300 may need to be a large scale L2 routing network with a distributed VM mobility control and a dedicated network for centralized network storage. However, distributed VM mobility control and dedicated networks for centralized network storage may not scale well with an increasing number of servers in a modern DC network. Some DC networks may have thousands of servers with 20-40 VMs on each server. Thus, network 300 may need an L2 routing protocol to update the location data for VM 310B after the migration, which may lead to scalability, protocol complexity, and interoperability issues. Network 300 may keep a flat L2 topology during VM migration by using a vSwitch approach for intra-DC network domain VM migrations or an L2 tunneling approach for inter-DC network domain VM migrations.

In an embodiment, network 300 may keep a flat L2 topology during VM migration by using a vSwitch approach. A vSwitch approach may entail implementing a vSwitch built on top of a physical L2 switch and a hypervisor. The vSwitch running under the control of the hypervisor may perform switching for a virtual network interface controller (vNIC) on a server (e.g. server 112 of FIG. 1). In an embodiment, Server A 320 may need to perform an intra-DC network domain migration of VM 310 to a Server B 330. Server B 330 may need to be manually configured to accept the attachment of VM 310. Once VM 310 is attached to Server B 330, an IP version four (IPv4) ARP or IP version six (IPv6) Neighbor Discovery (ND) protocol may be needed, such as the IPv4 ARP described in the Internet Engineering Task Force (IETF) Request for Comments (RFC) 826 and IPv6 ND described by IETF RFC 4861, both of which are incorporated herein by reference. Only Server B 330 may know when the migration finishes, and thus it may send certain data or control packets (e.g. gratuitous ARP requests, a gratuitous ARP replies, or reverse ARPs) to signal the entities of network 300 that the migration of VM 310 is complete and VM 310 is ready to receive packets at the new location. A flood of ARP messages to all network 300 entities to resolve host link layer addresses may result, and thus exhaust a substantial amount of system resources (e.g., bandwidth). For example, Server B 330 may need to signal vSwitch 340 that VM 310B is operational so that vSwitch 340 may begin forwarding data packets for VM 310 to Server B 330 rather than Server A 320. Also, Server B 330 may need to signal Server A 320 that VM 310B is operational so that Server A 320 can terminate VM 310A and reallocate its assets. Such ARP flooding mechanism may suffer from scalability issues, as the number of servers and/or VMs increases. Relative ease of implementation may make the vSwitch approach attractive, but vSwitches are vendor-specific. Thus, vendor A's vSwitch may not be interoperable with vendor B's vSwitch. Also, the density of implementing a vSwitch over a physical L2 switch may limit the scalability of the vSwitch approach. For example, L2 MAC layer routing for intra-DC migrations may be limited since only about 4 vSwitches may be implemented over one physical L2 switch. One DC may only support about 10,000-20,000 servers due to the limit on L2 MAC layer routing.

In another embodiment, network 300 may keep a flat L2 topology during VM migration by using an L2 tunneling (L2-over-L3) approach. An L2-over-layer three (L3) approach may be used for an inter-DC migration of VM 310, which may apply OSI L3 routing concepts to L2 routing. The L2-over-L3 approach may add new header information into an L2 frame and may support L2 routing, forwarding, and topology discovery with an L3 routing protocol, such as Intermediate System to Intermediate System (IS-IS) routing. The new header information may form a tunnel from an L2 routing perspective that may carry all VM information between two L2 switches. Network 300 may implement the L2-over-L3 approach for inter-DC network domain migration of VM 310 in various ways. For example, network 300 may build an L3 bridge between Server A 320 and Server B 330 by using hardware-based Virtual Private LAN Services (VPLSs), such as with MPLS over an L2 Virtual Private LANs (L2VPNs). Server A 320 or Server B 330 may encapsulate/decapsulate L2 frames using a VPLS. In another example, network 300 may build the L3 bridge to encapsulate/decapsulate L2 frames using a software-based, L2-over-L3 tunneling protocol. Network 300 may accordingly operate as a Generic Routing Encapsulation (GRE) network, a Transparent Interconnection of Lots of Links (TRILL) network, Shortest Path Bridging (SPB) network, and/or an Optical Transport Virtualization (OTV) network using User Datagram Protocol (UDP). The ability to support a larger scale L2 network topology for VM migration may make the L2-over-L3 approach attractive. However, the L2-over-L3 approach may increase the implementation and management complexity of network 300 by introducing new routing and/or forwarding protocols, which may require new hardware and/or software. Also, L2 switches may comprise a relatively simple data forwarding plane capable of fast performance (e.g. 10-40 Gigabits per second (Gbps) for an Ethernet switch port), which may not be possible after introducing L3 routing/forwarding concepts.

Figure 4:
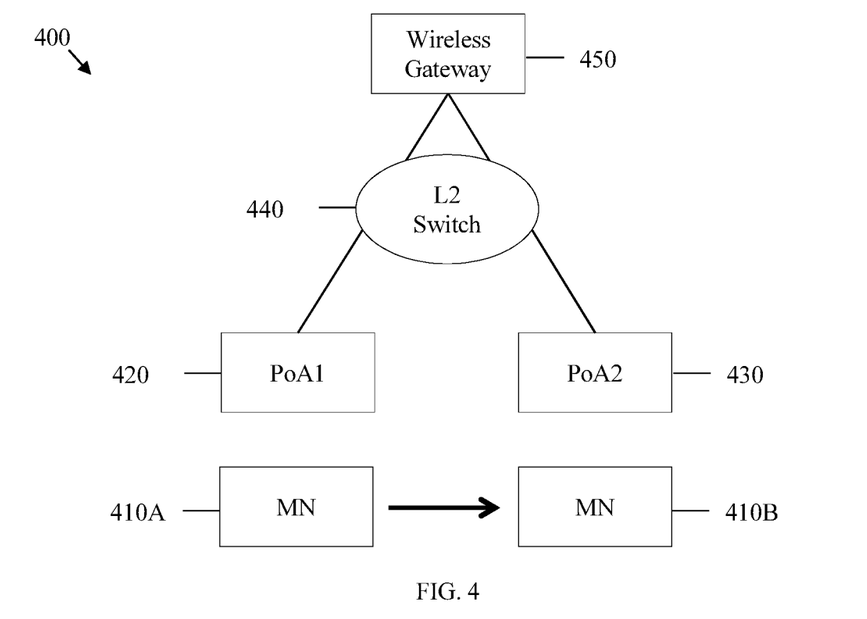
FIG. 4 illustrates an embodiment of a mobile network supporting mobile node (MN) mobility through name-based mobility control.

FIG. 4 illustrates an embodiment of a mobile network 400 supporting MN mobility through name-based mobility control. Network 400 may comprise a first point of attachment (PoA1) 420, a second point of attachment (PoA2) 430, an L2 switch 440, and a wireless gateway (GW) 450. A controller coupled to wireless GW 450 may centrally manage network 400 and maintain knowledge of the attachment topology of any entity within network 400. As the centralized controller of network 400, wireless GW 450 may serve as a mobility anchor for MNs that may attach to any point of attachment (PoA) within network 400. Wireless GW 450 may store a data flow table comprising a plurality of entity profiles for each entity within network 400 (e.g. MN 410, PoA1 420, PoA2 430, L2 switch 440, and/or wireless GW 450). Each of the plurality of entity profiles comprises an entity identifier (e.g. an IP/MAC address) and a location identifier, which may identify the entity's topological location in network 400. An entity identifier in network 400 may serve the role of exclusively identifying an entity (e.g. content, a portion of content, a NE, or a MN). Network 400 may use the location identifier for inter/intra-domain routing purposes. L2 switch 440 may be configured as an aggregation point for all PoAs within network 400 and route data packets to and from entities within network 400 according to the data flow table. A PoA may be an entity (e.g. a cellular network base station and/or any type of access point for IEEE standard 802.11 networks) configured to provide an access point to network 400 for one or more MNs. An MN (e.g. a smart phone, a laptop, or a tablet) may be a client of a home network domain in communication with network 400 having network domain roaming capabilities. The MN may be in communication with one or more entities, often referred to as correspondent nodes (CNs). A CN may be any client or peer entity capable of maintaining a data communication with the MN. The MN (e.g. MN 410) may be assigned an entity identifier by a centralized controller within the home network domain. The entity identifier may exclusively identify MN from any other entities that may be in communication with the home network domain. The centralized controller may be configured to manage all inter-domain and intra-domain routing for the home network domain (e.g. data packets between an MN and a CN) and store a home data flow table that maps a client's (e.g. an MN's) entity identifier with the client's current location.

In an embodiment, MN 410 may have roamed into network 400 while communicating with a CN (not shown) outside of network 400. MN 410 at a time A (MN 410A) may access network 400 by attaching to PoA1 420 through an attachment protocol. PoA1 420 may forward a proxy update to wireless GW 450 comprising the entity identifiers of MN 410 and PoA1 420. Wireless GW 450 may update the network data flow table, respond with an acknowledgement to PoA1 420, and notify the home network domain's centralized controller of the current location of MN 410 via an updated location identifier. The network domain centralized controller may update MN 410's location identifier in the home data flow table (leaving the entity identifier for MN 410 unchanged). PoA1 420 may add MN 410 to its routing tables corresponding to a port assigned to MN 410. Wireless GW 450 may then serve as a local mobility anchor for MN 410 with respect to the home network domain as long as MN 410 remains within network 400 and PoA1 420 may serve as a local proxy for MN 410. The home network domain centralized controller may begin routing data packets for MN 410 to wireless GW 450, which may forward the data packets to the port of PoA1 420 assigned to MN 410. Consequently, the handoff of MN 410 from a prior PoA to PoA1 420 may remain transparent to CN since only intermediate routing information was changed while leaving the entity identifier of MN 410 unchanged. MN 410 at a time B (MN 410B) may continue roaming within network 400 and attach to PoA2 430 through an attachment protocol. PoA2 430 may forward a proxy update to wireless GW 450, which may update the location identifier for MN 410 in the network data flow table. Wireless GW 450 may not update the home network domain centralized controller since MN 410 remains in network 400 leaving wireless GW 450 as the local mobility anchor for MN 410 with respect to the home network domain. PoA1 420 may be deregistered as the local proxy after PoA2 430 is registered to serve as a local proxy for MN 410B. Wireless GW 450 may begin forwarding data packets from the home network domain centralized controller to MN 410B via PoA2 430. Thus, network 400 may use the entity identifier to uniquely identify an entity (e.g. MN 410) rather than for routing purposes, which may permit seamless transitions as the entity changes PoAs within network 400.

Figure 5:
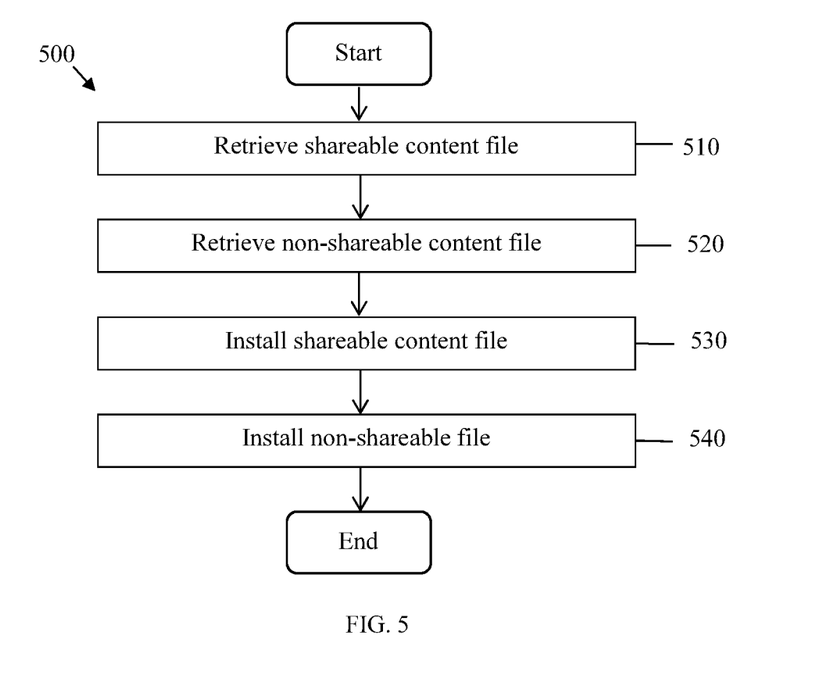
FIG. 5 is a flowchart of an embodiment of a method of establishing a VM on a server by a hypervisor.

FIG. 5 is a flowchart of an embodiment of a method 500 of establishing a VM on a server by a hypervisor. Method 500 may be employed for migration of a VM (e.g. VM 220 of FIG. 2) and its associated data from a source server (e.g. Server A 320 of FIG. 3) onto a destination server (e.g. Server B 330 of FIG. 3). In block 510, a shareable content file comprising computing power and/or associated data resources such as a VM OS may be retrieved by a destination hypervisor (e.g. hypervisor 210 of FIG. 2). The shareable content file may comprise a VM core OS, application/service software, and/or libraries that applications or services may need to operate. The shareable content file may comprise data resources that may not be specific to any particular VM, and consequently the shareable content file may not need to be reconfigured for each VM in a network. As a result, the shareable content file may not need to be retrieved from any particular place within the network and many VMs may use the same shareable content file. Thus, the shareable content file may be stored in numerous locations within the network either as a single file or divided into a plurality of packet-level file segments. In an embodiment, instead of retrieving one large shareable content file from one central location, a destination hypervisor may utilize multiple pathways to retrieve a plurality of smaller file segments from a plurality of storage locations. In block 520, a non-shareable content file may be retrieved by the destination hypervisor comprising client data and/or VM configuration information. The non-shareable content file may comprise VM-specific application/services with associated data and/or run-time transaction status information (e.g. protocol state, port configuration, and/or port status information). Thus, non-shareable content may comprise data resources that are specific to a particular VM, and consequently the destination hypervisor may need an end-to-end, uni-casting communication with a source server to retrieve the non-shareable content file. The dual nature of the VM content files may permit a network to support dual-modes of delivery for the VM content files. One delivery mode for the sharable content file may be in the form of network caching and the other delivery mode for non-sharable content file may be in the form of an end point-to-end point connection. The destination hypervisor may then install the shareable content file onto the destination server at block 530 to establish a generic VM. In block 540, the destination hypervisor may use non-shareable content to boot a migrated VM from a source server onto the destination server.

Figure 6:
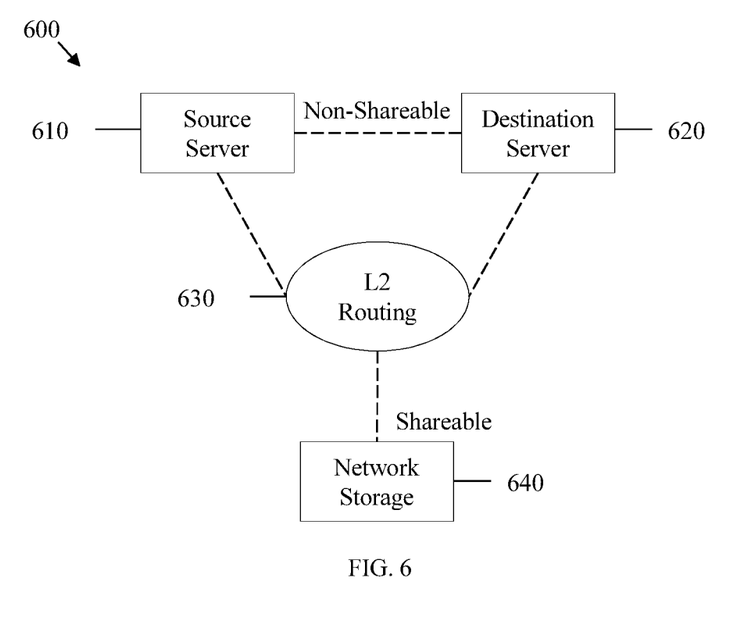
FIG. 6 is a schematic diagram of an embodiment of a DC network supporting VM mobility through address-based data routing.

FIG. 6 illustrates an embodiment of a DC network 600 supporting VM mobility through address-based data routing. Network 600 may be an address-based routing network that may use an entity identifier (e.g. an IP/MAC address) to simultaneously serve dual roles of identifying an entity and a location of the entity within the network. Network 600 may comprise a source server 610, a destination server 620, an L2 routing block 630, and a network storage block 640. Source server 610 may host a VM (e.g. VM 310 of FIG. 3) managed by a hypervisor (e.g. hypervisor 210 of FIG. 2). The VM hosted by source server 610 may be established for migration to destination server 620 while serving a remote client. In order to provide client service continuity during migration, source server 610 and destination server 620 may need to be located on the same subnet to keep the entity identifier of the VM unchanged following migration. L2 routing block 630 may comprise one or more nodes (e.g. routers and/or switches) that may interconnect source server 610, destination server 620, and network storage block 640. Each node may be configured to provide both a data path component and a control path component. The data path component may allow the node to route data packets within network 600 while the control path component may determine the appropriate routing path for the data packet. In network 600, the data path and control path components may operate independently. Network 600 may use an address-based data flow table that may instruct the data path component how and/or where to route a received data packet. If the data path component receives a data packet that the data flow table does not address, the data path component may forward the data packet to the control path component. The control path component may examine the received data packet to determine how and/or where to route the data packet. Based upon its determination, the control path component may update the data flow table and return the data packet to the data path component for routing. Thus, each node of L2 routing block 630 may independently make routing decisions, which may result in decentralized VM mobility control within network 600. In an embodiment, the nodes of L2 routing block 630 may need to be manually provisioned prior to migration of the VM. Prior knowledge of the entity identifiers of the shareable content storage location, the non-shareable content storage location, and destination server 620 may be needed for this manual provisioning. Once the nodes of L2 routing block 630 have been manually provisioned, a hypervisor running on destination server 620 (destination hypervisor) may implement a method of establishing a VM (e.g. method 500). The destination hypervisor may retrieve a VM shareable content file from network storage block 640 and a VM non-shareable content file from source server 610 via L2 routing block 630. The VM shareable content may be installed onto destination server 620 and the destination hypervisor may then use the VM non-shareable content file to boot a migrated VM. Once the migrated VM is ready to serve the remote client, destination server 620 may initiate ARP or ND protocol messaging so the entity identifier for the VM may be updated in each of the data flow tables to reflect the current location of the VM. The migrated VM may then receive data packets at destination server 620.

Figure 7:
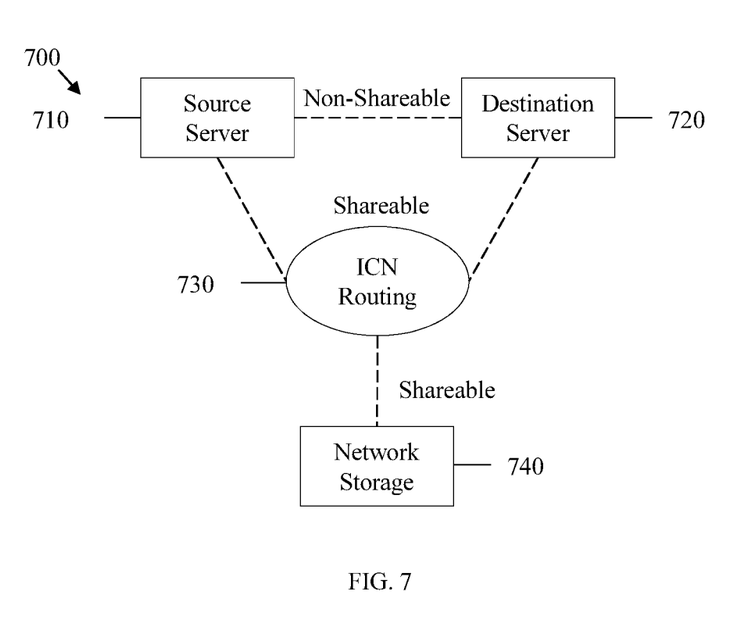
FIG. 7 is a schematic diagram of an embodiment of a DC network supporting VM mobility through name-based data routing.

FIG. 7 illustrates an embodiment of a DC network 700 supporting VM mobility through name-based data routing. Network 700 may be a name-based network that maintains a data flow table comprising an entity profile for each named entity within the network (e.g. a VM, a server, a service/application executable code base, a shareable content file, and a non-shareable content file) in a centralized location. Each entity profile may comprise an entity identifier (e.g. an IP/MAC address) and a location identifier, which may identify the entity's topological location in network 700. An entity identifier in network 700 may serve the role of uniquely identifying an entity within the network whereas the location identifier may be used for data packet routing purposes. Network 700 may comprise a source server 710, a destination server 720, an information centric network (ICN) routing block 730, and a network storage block 740 (e.g. network storage block 640 of FIG. 6). Source server 710 may host a VM (e.g. VM 310 of FIG. 3) managed by a hypervisor (e.g. hypervisor 210 of FIG. 2). Similar to L2 routing block 630 of FIG. 6, ICN routing block 730 may also comprise one or more nodes (e.g. routers and/or switches) that may interconnect source server 710, destination server 720, and network storage block 740. Unlike L2 routing block 630, each node of ICN routing block 730 may be configured to provide only a data path component. If a data packet is received that the data path component does not know how and/or where to route, the data path component may consult with a control path component in the centralized location for instruction. Also, each node of ICN routing block 730 may further comprise a node storage component and/or a computing pool, which may form part of a network data storage cache and/or computing base for VM shareable content files and service/application executable code. The VM shareable content file and service/application executable code may be either stored as a single file or segmented into a plurality of packet level file segments. Regardless of how the VM shareable content is stored, an entity profile associated with the VM shareable content (or packet level file segments) may be maintained in the data flow table. Decentralized ICN-enabled routers with storage and computing power capabilities may enable decentralized storage of VM shareable content files in network 700. Also, network 700 may retain centralized VM mobility control by removing the control path component from each node of ICN routing block 730 to a centralized location.

In an embodiment, the VM hosted by source server 710 may be established for migration to destination server 720 while serving a remote client. Since network 700 may use the location identifier of an entity for inter/intra-domain routing purposes, the entity identifier may remain unchanged during migration of the VM to provide client service continuity. A hypervisor running on destination server 720 may implement a method of establishing a VM (e.g. method 500). The destination hypervisor may express an interest in retrieving the VM shareable content file by its entity identifier without prior knowledge of where the VM shareable content file may be stored. In network 700, centralized VM mobility control coupled with the storage capabilities of ICN routing block 730 nodes may enable flexibility for retrieving the VM shareable content file by the destination hypervisor. ICN routing block 730 may be configured so that the destination hypervisor may retrieve the VM shareable content file from network storage block 740 and/or from the network data storage cache formed by the nodes. The VM shareable content file may be retrieved via a multi-path communication (e.g. multicasting, group casting, and/or any-casting) by distributing storage of the VM shareable content file throughout network 700. However, the VM non-shareable content may only be retrievable from source server 710 via an end-to-end, uni-casting communication connection. Once the destination hypervisor retrieves the VM shareable content file, it may be installed onto destination server 720. The destination hypervisor may then use the VM non-shareable content file to boot a migrated VM onto the destination server 720. Once the migrated VM is ready to serve the remote client, destination server 720 may message the centralized VM mobility control so the location identifier of the entity profile corresponding to the VM may be updated.

Figure 8:
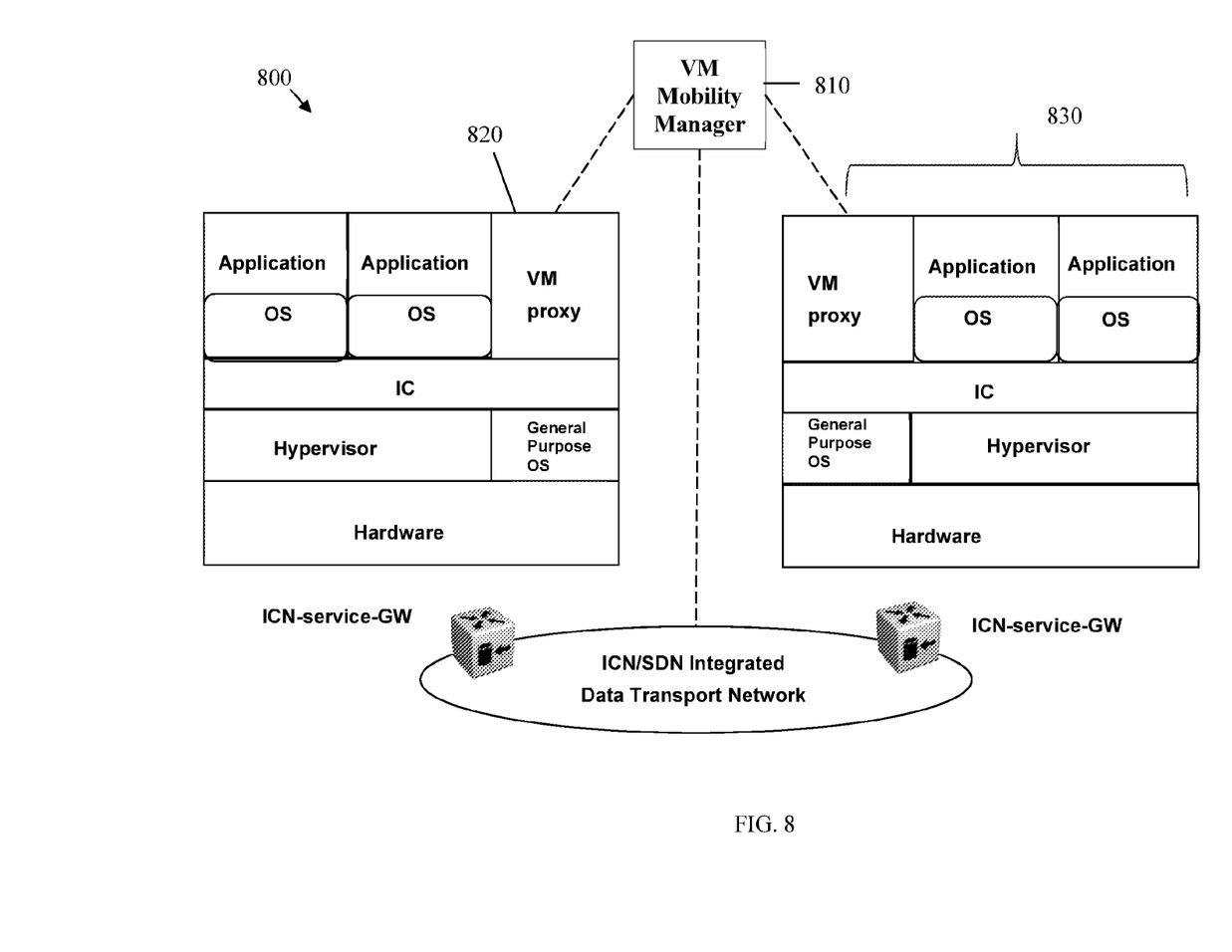
FIG. 8 is a schematic diagram of an embodiment of a network supporting VM mobility through name-based mobility control and name-based data routing.

FIG. 8 illustrates an embodiment of a mobility management network 800 supporting VM mobility through name-based mobility control and name-based data routing. VM mobility within network 800 may involve a two-tier management system comprising a per-domain based VMMM 810 and a per-server based VM proxy 820. VMMM 810 may be located on a DC GW router and/or a controller box coupled to the DC GW router. The DC GW router may serve as a mobility anchor for all data flow traffic associated with servers within the DC network domain of VMMM 810. VMMM 810 may serve as a centralized management for servers located within its DC network domain similar to a radio network controller and/or home location registry within a mobile IP network. Thus, VMMM 810 may maintain knowledge of the attachment topology of all entities within its DC network domain. Also, VMMM 810 may be coupled to a DC resource manager (not shown) that may centrally manage the resources of a plurality of DC network domains that may form a DC network. VMMM 810 may coordinate with the VMMM of another DC network domain for any intra-DC network domain VM migrations.

A VM proxy 820 may be attached to every server 830 within the DC network domain centrally managed by VMMM 810. VM proxy 820 may coordinate with VMMM 810 for any VM mobility involving the server 830 hosting VM proxy 820. For example, VM proxy 820 may message VMMM 810 to release the attachment of a VM from server 830 when the VM hosted by server 830 is migrated to another server. Alternatively, VM proxy 820 may message VMMM 810 to book the attachment of a VM to server 815 when the VM hosted by another server is migrated to server 830.

Figure 9:
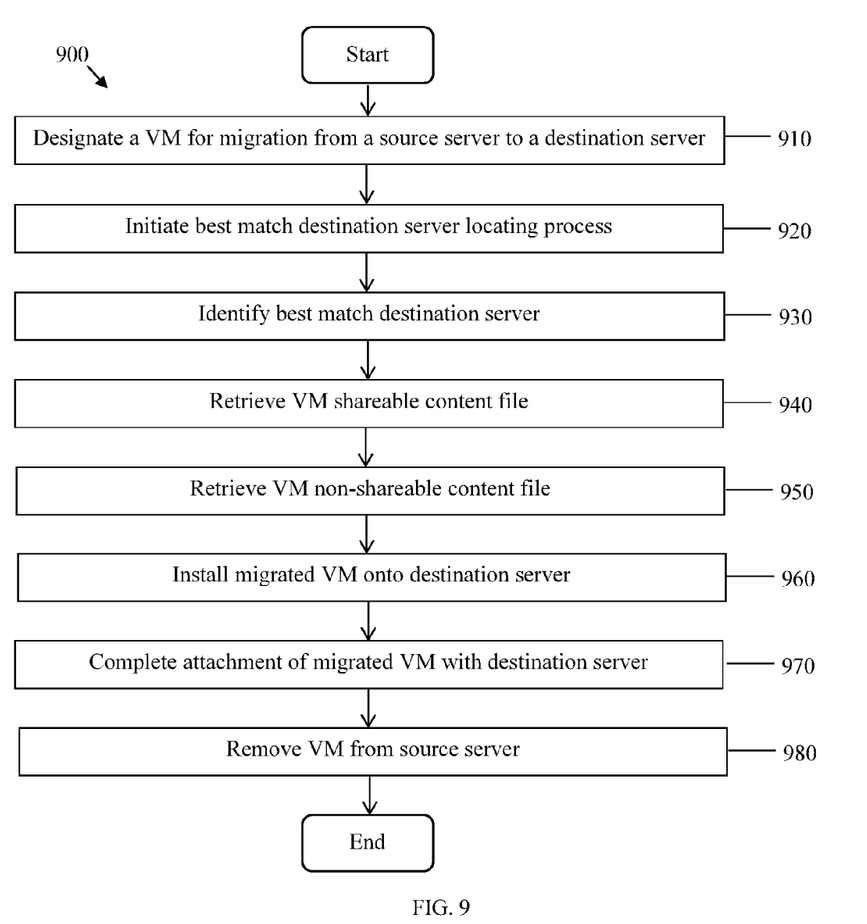
FIG. 9 is a schematic diagram of an embodiment of VM mobility management method, which may be implemented in a DC network.

FIG. 9 illustrates an embodiment of VM mobility management method 900, which may be implemented in a DC network (e.g. DC network 100 of FIG. 1). Method 900 may be employed for inter and/or intra-DC migration of a VM (e.g. VM 220 of FIG. 2). In block 910, a VM may be designated for migration from a source server to a destination server. In an embodiment, a source hypervisor running on a source server may determine that a VM should be migrated to another server based upon changes in the requirements of the VM, source server, and/or DC network. For example, the VM may require more computing power, greater bandwidth, and/or reducing its response time due to a location change of the VM's client. A DC network and/or network domain management system may also initiate migration of the VM to increase the DC resource utilization rate through load balancing. The DC network management system may support DC network resource management and/or related name resolution services. The source hypervisor may query a DC network resource manager for a service profile of the VM. The VM service profile may include information specific to the VM such as an OS type and version, applications/services installed on the VM, and/or other requirements of the VM (e.g. bandwidth and computing power requirements). The source hypervisor may request that a source VM proxy managing VM mobility for the source server initiate a VM mobility operation.

In block 920, a VM migration request message may be sent to initiate the process of locating a best match destination server for the VM. The source VM proxy may send a migration request message to a source VMMM to initiate the process of locating a best match destination server. The migration request message may comprise the VM service profile, an interested service name/profile context, and information associated with current clients of the VM. The source VMMM may forward a migration match message to all VM proxies within a domain of the source VMMM and/or to other VMMMs managing other domains. The migration match message may be transmitted via a multi-path communication (e.g. multicasting, group casting, and/or any-casting), which may depend on how a service name resolution may be implemented for the VMMMs. The other VMMMs may then forward the migration match message to all VM proxies within their respective domains.

In block 930, a best match destination server may be located for the VM. The source VMMM may receive responses from the VM proxies within the source domain and/or from the other VMMMs outside the domain of the source VMMM. The source VMMM may compile the responses and based upon the responses determine a destination server that may be a best match to host the VM following the VM migration.

In block 940, the destination VM proxy may be notified of the migration and may retrieve the VM shareable content file to begin migration of the VM from the source server to the destination server. If the destination server is located within the source domain, the source VMMM may initiate the VM migration by forwarding a VM migration initiation message comprising the VM service profile to a destination VM proxy. If the destination server is located outside of the source domain, the source VMMM may forward the migration request message to a destination VMMM managing VM mobility within the domain of the destination server. The destination VM proxy may retrieve the VM shareable content file for the VM from the ICN network based upon the VM service profile. The VM shareable content file may be stored on one or more of the ICN routers within the ICN network as a single file or segmented into a plurality of packet-level file segments. If the shareable content file is retrieved in the packet-level file segment form, the destination VM proxy may assemble the file segments into a single file.

In block 950, the destination VM proxy may retrieve the VM non-shareable content file for the VM based upon the VM service profile. If the destination server is located within the source domain, the source VMMM may create an end-to-end connection between the source server and the destination server. If the destination server is located outside the source domain, the destination VMMM coordinating with the source VMMM may create an end-to-end connection between the source server and the destination server. In an embodiment, the VM non-shareable content file may only be retrievable from random access memory (RAM) associated with the VM. The VM may also continue serving the client during migration, and consequently the VM non-shareable content file specific to the VM may need to be revised. Due to the revisions of the VM non-shareable content file, communications between the source server and the destination server may need to be an end-to-end data transport. Thus, the end-to-end connection (e.g. intra or inter-domain) may be a secure communication channel (e.g. a VPN or a secure socket layer (SSL) connection) over a dedicated network connection with high bandwidth and low latency. The end-to-end connection may either be a preexisting connection or established on-demand (e.g. via an SDN controller if the underline network is SDN-enabled).

In block 960, a migrated VM may be installed onto the destination server by the destination hypervisor. The destination VM proxy may forward the VM shareable and non-shareable content files to the destination hypervisor. The destination hypervisor may combine the VM shareable and non-shareable content files into a VM bootable image. The migrated VM may be booted from the VM bootable image by the destination hypervisor. While the migrated VM is booting, the destination hypervisor may update the RAM allocated to the migrated VM with the revisions to the VM non-shareable content file.

In block 970, the destination VM proxy may book the migrated VM with the destination VMMM to complete attachment of the migrated VM to the destination server. If the destination server is within the source domain, the source VMMM may create a bi-cast data flow between the VM on the source server and the migrated VM. If the destination server is located outside the source domain, the destination VMMM may coordinate with the source VMMM to create the bi-cast data flow. The bi-cast data flow may direct incoming data flows to both the VM on the source server and the migrated VM via a domain gateway switch. Thus, the VM and the migrated VM may receive the same client traffic during VM migration.

In block 980, the destination VM proxy may notify the source VM proxy that the migrated VM is ready to serve the client. The source VMMM (or the destination VMMM if the destination server is located outside the source domain) may register the migrated VM and its attachment to the destination server with the DC network resource manager. The DC network resource manager may update the VM service profile. Once the VM service profile is updated, the bi-casting of data flows may be terminated with all data flows being directed to the migrated VM. Also, the source VMMM may remove the VM on the source server from its booking and release source server resources allocated to the VM.

Figure 10:
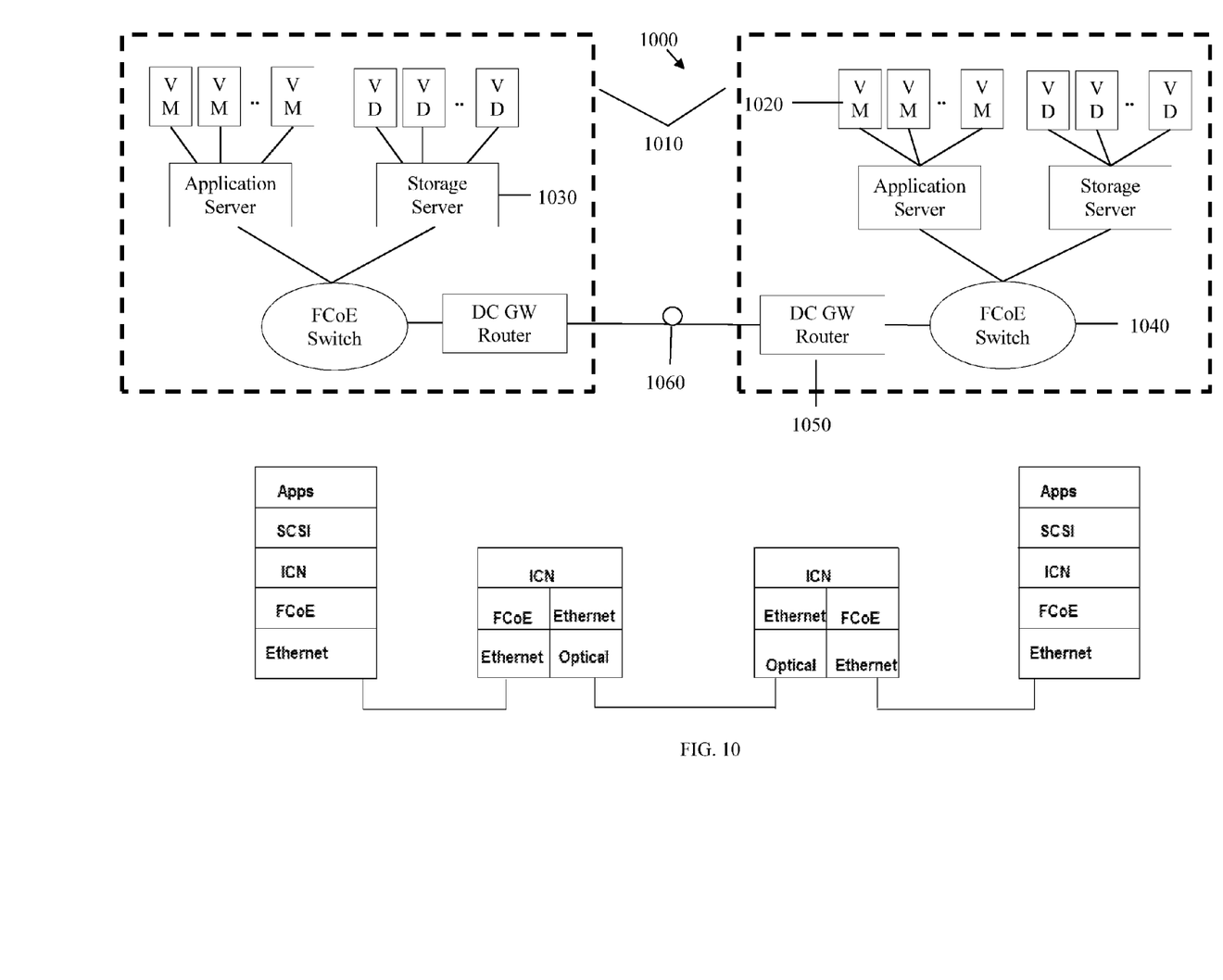
FIG. 10 is a schematic diagram of an embodiment of a DC network supporting name-based VM mobility with a Fiber Channel over Ethernet (FCoE) overlay.

FIG. 10 illustrates an embodiment of a DC network 1000 supporting name-based VM mobility with a Fiber Channel over Ethernet (FCoE) overlay. In network 1000, VM shareable and/or non-shareable content files may be stored in a storage area network (SAN) comprising a storage server 1030 hosting virtual disks (VDs). Data flow traffic between storage server 1030 and an FCoE switch 1040 may be mapped into Fiber Channel (FC) frames. Data flow traffic between an application server 1020 hosting VMs (e.g. VM 220 of FIG. 2) and an FCoE switch 1040 may be mapped into Ethernet frames. Network 1000 may integrate the FC based storage server 1030 data flow traffic with the Ethernet based application server 1020 data flow traffic by implementing FCoE technology. FCoE is a technology used for transporting Fiber Channel (FC) frames over Ethernet, which is currently being standardized at the Technical Committee for Fiber Channel (T11) of the International Committee for Information Technology Standards (INCITS). The FCoE technology replaces the FC physical (FC-0) and FC coding (FC-1) layers of the FC architecture with the Ethernet physical and MAC layers of the Ethernet architecture without altering the FC framing (FC-2) layer and higher layers. Using the FCoE technology, the FC frames and standard Ethernet frames can be transported independently in the network. Accordingly, storage server 1030 FC frames are mapped over Ethernet frames by FCoE switch 1040, which may provide substantially seamless integration between the FC and Ethernet based networks. Application server 1020 and storage server 1030 data flows within a DC domain 1010 may then be routed according to the same data flow table. Inter-DC domain data flows for both application server 1020 and storage server 1030 may then be received DC GW router 1050 via an inter-DC domain communication link 1060 (e.g. an optical link). DC GW routers 1050 may be enabled by name-based routing/forwarding to support data chunk access, data chunk retrieval, service look up, application look up, and/or multicast/any-cast routing for VM mobility. In an embodiment, these functionalities may be implemented in an ICN protocol layer above FCoE. The DC network domain data flow table may be centrally managed by a DC resource manager, which may further facilitate inter-DC domain VM mobility. Thus, network 1000 may operate like a single, converged network, which may reduce the complexity, space, and cost necessary to maintain the network infrastructure while keeping native Ethernet as a high speed forwarding plane.

Figure 11:
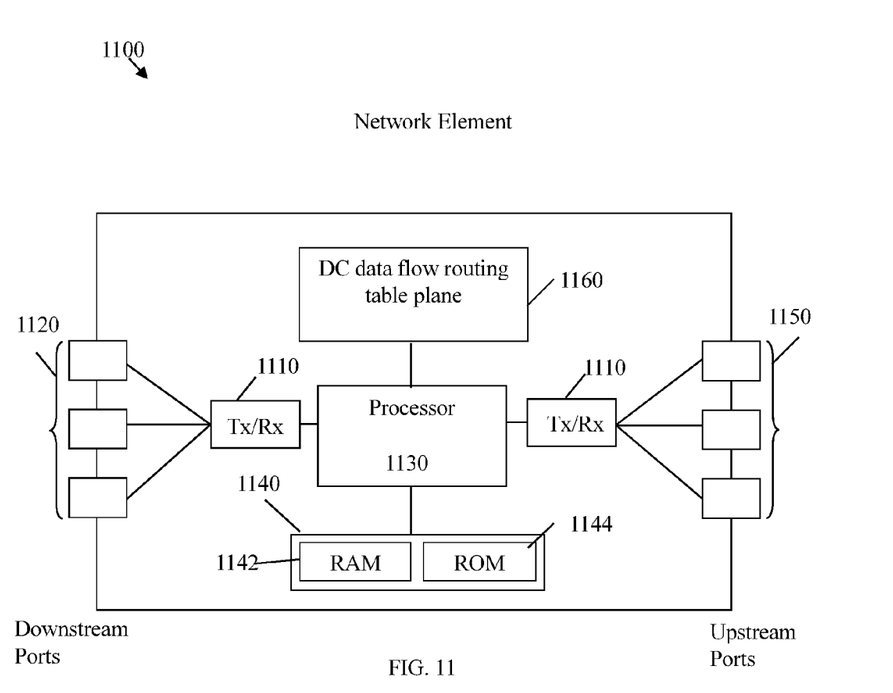
FIG. 11 is a schematic diagram of an embodiment of a Network Element.

At least some of the features/methods described in the disclosure may be implemented in a NE. For instance, the features/methods of the disclosure may be implemented using hardware, firmware, and/or software installed to run on hardware. For example, the network element may be any device that transports data through a network, e.g., a switch, router, bridge, server, client, etc. FIG. 11 is a schematic diagram of an embodiment of a NE 1100, which may comprise a server 112 of FIG. 1, a network storage block 640 of FIG. 6, and/or a DC GW router 1050 of FIG. 10. For instance, NE 1100 may be configured to update a DC data flow routing table.

NE 1100 may comprise one or more ingress ports or faces coupled to a transceiver (Tx/Rx) 1110, which may be transmitters, receivers, or combinations thereof. A Tx/Rx 1110 may be coupled to plurality of downstream ports 1120 for transmitting and/or receiving data packets from other nodes. Tx/Rx 1110 may be coupled to a plurality of upstream ports 1150 for transmitting and/or receiving data packets from other nodes. A processor 1130 may be coupled to the Tx/Rxs 1110 to process the packets and/or to determine the nodes to which to send packets. The processor 1130 may comprise one or more multi-core processors and/or memory modules 1140, which may function as data stores, buffers, etc. Processor 1130 may be implemented as a general processor or may be part of one or more application specific integrated circuits (ASICs) and/or digital signal processors (DSPs). The downstream ports 1120 and/or the upstream ports 1150 may contain electrical and/or optical transmitting and/or receiving components. NE 1100 may or may not be a routing component that makes routing decisions. NE 1100 may also comprise a DC data flow routing table block 1160. The DC data flow routing table block 1160 may be configured to implement data flow routing table updates, such as at a data link layer or L2 in the OSI model, where the DC data flow routing tables may be updated based on updated entity profiles. Such entity profile information may be maintained in a content table at the memory module 1140. The DC data flow routing table block 1160 may receive entity profile updates for VMs in the DC network from VM proxies managing VM mobility on a per-server basis to update the DC data flow routing table block 1160. The DC data flow routing table block 1160 may be implemented using software, hardware, or both and may operate on the IP layer and/or L2 in the OSI model. The memory module 1140 may comprise a cache 1142 for temporarily storing content, e.g., a RAM. Additionally, the memory module 1140 may comprise a long-term storage 1144 for storing content relatively longer, e.g., a Read Only Memory (ROM). For instance, the cache 1142 and the long-term storage 1144 may include Dynamic random-access memories (DRAMs), solid-state drives (SSDs), hard disks, or combinations thereof. Notably, the memory module 1140 may be used to house the instructions for carrying out the system and methods described herein.

It is understood that by programming and/or loading executable instructions onto the NE 1100, at least one of the processors 1130, the cache 1142, and the long-term storage 1144 are changed, transforming NE 1100 in part into a particular machine or apparatus, e.g., a VM mobility architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a memory;
   a processor coupled to the memory, wherein the memory contains instructions that when executed by the processor cause the apparatus to:
   receive a migration request from a virtual machine (VM) proxy running on a first server hosting a VM, wherein the migration request comprises a VM identifier associated with the VM comprising a globally unique VM name and a current VM address associated with the first server, and wherein data packets associated with the VM are routed to the VM based upon the VM identifier; and
   instruct a VM proxy running on a second server to receive the VM from the first server in response to the migration request, wherein the VM name remains unchanged while the current VM address becomes associated with the second server after the second server receives the VM.

2. The apparatus of claim 1, further comprising receiving a VM registration request from the second server VM proxy after the second server receives the VM, and wherein the current VM address becomes associated with the second server based upon the VM registration request.

3. The apparatus of claim 2, wherein the instructions further cause the apparatus to send a VM deregistration message to the first server VM proxy in response to the VM registration request, and wherein the deregistration message instructs the first server VM proxy to remove data on the first server associated with the VM.

4. The apparatus of claim 1, wherein the migration request further comprises a VM client identifier associated with at least one client the VM is serving, and wherein the VM continues to serve any clients associated with the VM client identifier while migrating from the first server to the second server.

5. The apparatus of claim 4, wherein data packets originating from clients associated with the VM client identifier are routed to the first server and the second server before the apparatus sends the deregistration message.

6. The apparatus of claim 5, wherein data packets originating from clients associated with the VM client identifier are no longer routed to the first server after the apparatus sends the deregistration message.

7. The apparatus of claim 1, wherein the migration request further comprises a VM content file indicating shareable resources and non-shareable resources to support assembly of a VM bootable image for installation at the second server.

8. The apparatus of claim 7, wherein the indicated shareable resources are not specific to the VM, and wherein the indicated shareable resources are associated with network devices coupled to the second server.

9. The apparatus of claim 8, wherein the indicated shareable resources are divided into a plurality of packet-level files retrievable from a plurality of origins by the second server.

10. A server comprising:
a memory;
a processor coupled to the memory containing instructions;
at least one hypervisor managing a plurality of virtual machines (VMs) hosted by the server; and
a VM proxy in communication with the hypervisor and configured to:
receive a mobility message from the hypervisor comprising a first VM service profile, wherein the first VM service profile comprises a VM identifier associated with a first VM, wherein the VM identifier comprises a globally unique first VM name and a current first VM address associated with the server, and wherein data packets associated with the first VM are routed to the first VM based upon the VM identifier; and
send a migration request comprising the first VM service profile to a VM mobility manager (VMMM) of a local network domain to cause the local network domain VMMM to send a migration match message to VM proxies within the local network domain and a VMMM of a remote network domain, and wherein the migration match message comprises the first VM service profile.

11. The server of claim 10, wherein the VM proxy is further configured to receive migration match messages from the local network domain VMMM.

12. The server of claim 11, wherein the VM proxy is further configured to send a match response message to the local network domain VMMM to support selection of a destination server based a second VM service profile.

13. The server of claim 10, wherein the VM proxy is further configured to maintain globally unique VM names for VMs transferred across domains when a VM address associated with the VM changes.

14. The server of claim 10, wherein the first VM service profile further comprises a VM client identifier associated with at least one client served by the first VM, and a content file indicating shareable resources and non-shareable resources for assembly of a VM bootable image.

15. The server of claim 14, wherein the VM non-shareable resources are specific to the first VM, and wherein the VM non-shareable resources are transmitted to a destination server via an end-to-end connection setup by the remote network domain VMMM and the local network domain VMMM.

16. The server of claim 15, wherein the proxy is further configured to forward data packets to a remote domain destination server during installation of a transferred VM.

17. The server of claim 16, wherein a portion of the data packets transferred between the local network domain and the remote network domain are mapped into fiber channel frames encapsulated in Ethernet frames.

18. A method comprising:
receiving a migration request from a virtual machine (VM) proxy running on a first server hosting a VM, wherein the migration request comprises a VM identifier associated with the VM comprising a globally unique VM name and a current VM address associated with the first server, and wherein the VM identifier supports routing of data packets to the VM; and
instructing a VM proxy running on a second server to receive the VM from the first server in response to the migration request such that the globally unique VM name remains unchanged and the current VM address becomes associated with the second server.

19. The method of claim 18, further comprising:
receiving a VM registration request from the second server VM proxy when the second server receives the VM; and
associating the current VM address with the second server based upon the VM registration request.

20. The method of claim 19, further comprising sending a VM deregistration message to the first server VM proxy to instruct the first server VM proxy to remove data on the first server associated with the VM.

* * * * *